March 29, 1932. E. A. ASHCROFT 1,851,885
PROCESS FOR THE TREATMENT OF ORES OR MATERIALS
CONTAINING COPPER AND/OR NICKEL
Filed July 19, 1930
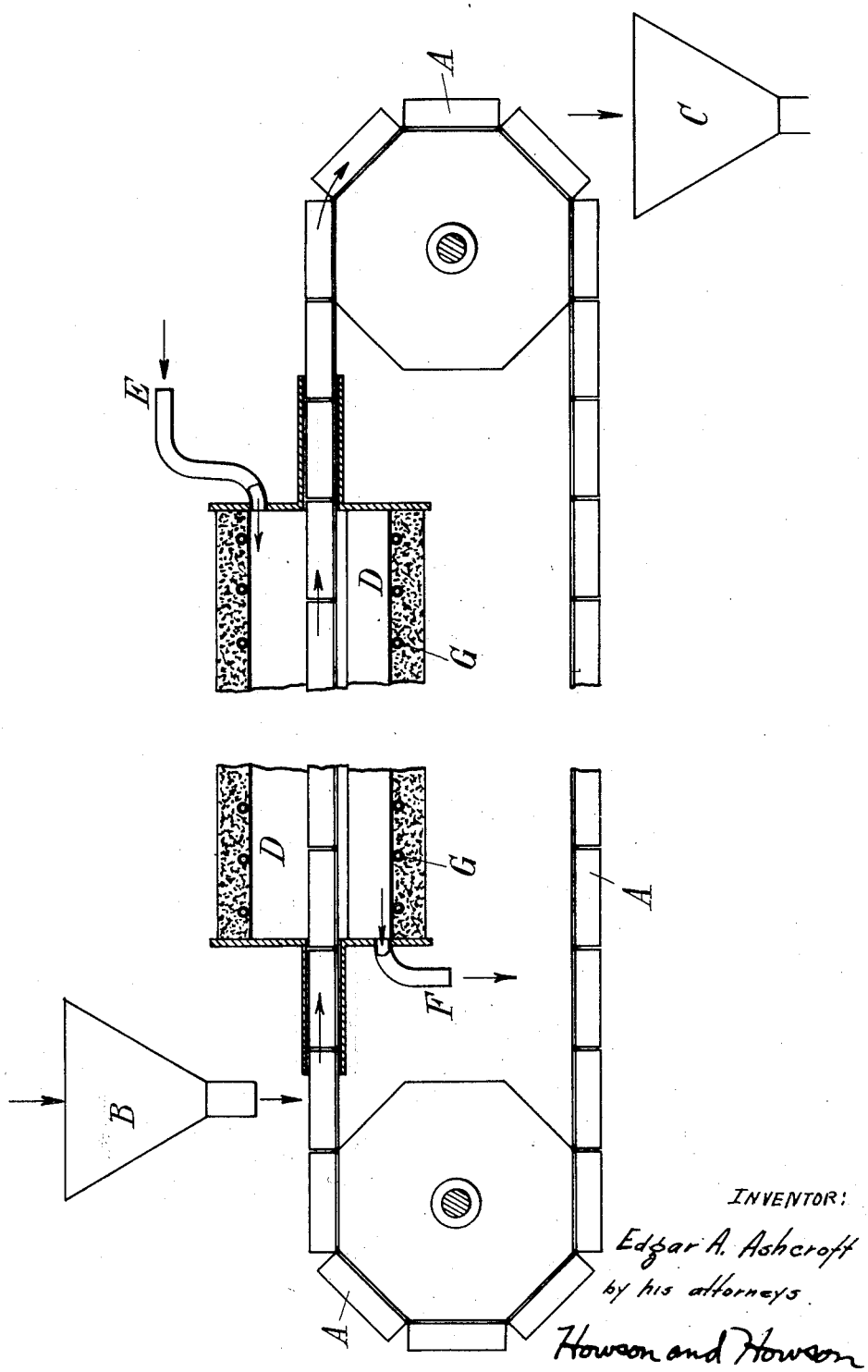
INVENTOR:
Edgar A. Ashcroft
by his attorneys
Howson and Howson Patented Mar. 29, 1932

1,851,885

UNITED STATES PATENT OFFICE

EDGAR ARTHUR ASHCROFT, OF WAYNE HOUSE, NEAR ASHBURTON, ENGLAND

PROCESS FOR THE TREATMENT OF ORES OR MATERIALS CONTAINING COPPER AND/OR NICKEL

Application filed July 19, 1930, Serial No. 469,276, and in Great Britain August 20, 1929.

My invention relates to the treatment of many kinds of materials containing copper in a variety of forms, with or without other metals or other valuable constituents but more particularly to materials whose main constituent is copper and/or nickel, as for instance, copper concentrates or ores such as are obtained from the extensive deposits in northern Rhodesia or the copper-nickel ores found in large quantities in Ontario e. g. in the Frood mine near Sudbury.

Such deposits contain the copper in the form of various well-known minerals, disseminated in a schistose or other gangue. The Rhodesian ores may be broadly said to contain from 1 to 6% of copper. The concentrates therefrom will carry 30 to 60% of copper in the same mineral forms.

Such ores are classed broadly as (1) oxidized ores, (2) sulphides or (3) partly oxidized sulphide ores, and it is usual to value the ores which contain the copper all as sulphides more highly than the others because of the greater ease and economy of extracting the copper found in that form by hitherto known methods.

By my herein described method no such disability applies to oxidized or partly oxidized ores and such may be treated as economically as the sulphide ores whilst the sulphide ores and the oxidized—or partly oxidized—ores may be treated more economically than by existing methods.

The principal sulphide minerals met with are chalcopyrite-containing iron copper and sulphur in approximately equal proportions, bornite a somewhat similar mineral, with more copper and less iron, chalcocite-containing copper and sulphur only, the copper being largely predominant (as cuprous sulphide), as well as composite sulphides, of which tetrahedryte-containing copper sulphide in chemical association with sulphides of other metals, e. g. iron, zinc, antimony etc,—is typical.

The nickel occurs usually in combination with copper as various complex sulphides and millerite.

These sulphide minerals are nearly similar in their flotability and amenability to existing metallurgical treatment generally and need not be further distinguished here.

The minerals classed as "oxidized" which are usually met with, however, differ very considerably in their readiness of response to leaching and allied methods of treatment. Amongst this class are native copper—cuprite—a red oxide containing 88.8% of copper as cuprous oxide—atacamite—a hydrated oxychloride of copper containing 16.64% of chlorine and 11.25% of copper-malachite—a carbonate of copper-azurite—a similar carbonate and chrysocolla—a hydrous copper silicate containing 45.3% of copper oxide, 34.2% silica and 20.5% water.

The oxidized nickel ores are mostly complex carbonates, oxides and silicates such as genthite or garnierite.

My invention is characterized—when a sulphide ore is in question—in that I oxidize the sulphur in such an ore by means of a regulated supply of oxygen and preferably in a self-heating or nearly self-heating apparatus—and cause it to combine with the copper and sulphur in all or most of the minerals present to form neutral water soluble copper sulphate which I can then remove and bring into solution in the cold by means of water only, or water and a very small amount of acid to correct any slight basicity of the copper salt.

I may for instance prepare a mixture of the ore or ores to be treated—with or without the addition of another sulphide such as iron sulphide, to ensure that there is sufficient sulphur present—such mixture being so proportioned that the total sulphur contained in the mixture is sufficient to satisfy the following equation (or thereabouts) in which the sulphur is all represented as being in simple combination with iron as ferrous sulphide and the copper all present as oxide, viz:

(1)  $2FeS + 2CuO + 9O = 2CuSO_4 + Fe_2O_3$

In actual fact the sulphur may be partly or wholly present in other combinations, as for instance in the form of other sulphides of iron or partly as copper sulphide; but variations in the nature of the compounds seem to make but little if any difference in the final result of the reactions, providing there is always at least as much sulphur present as is required to form copper sulphate with all the copper present in the ore under treatment, and further to supply sufficient sulphur trioxide to satisfy or neutralize any basic gangue matter or any other metal oxides except iron which may be present in the mixture.

As iron sulphide is the only sulphide which yields its acid to the surrounding oxides or basic compounds in the mixture and itself forms a permanent oxide it will be seen that in order to satisfy the aforesaid condition, iron sulphide—either alone or in the form of chalcopyrite or similar compounds—must always be present in a quantity at least equivalent to the molecular proportions of basic or oxidized ingredients present in the aforesaid mixtures.

My invention is further characterized in that I may treat the aforesaid materials preferably in suitable admixtures of sulphides and oxides and—sometimes with a suitable admixture of ferrous chloride or ferrous sulphate—with oxygen gas at a temperature of about 600° centigrade and in such a manner that the charge is not disturbed during the time of the reaction with oxygen, and the subsequent cooling, and I may cover all exposed surfaces with a very thin layer of inert material during reaction and cooling. Thereafter I may extract the produced soluble salts of copper and/or nickel—which are mostly sulphates—with water or dilute acids, for which I may use sulphuric acid in suitable amounts or—when ferrous chloride is admixed with the charges before oxygenization—the mixed acid solution—consisting largely of hydrochloric acid—which is given off from the charges during the oxygen treatment may be conveniently used over and over again.

In this manner practically the whole of the copper and the whole of the nickel present are extracted in one or more operations—usually one—leaving residues very low in both these metals and also having all the reactable gangue materials—calcium and the like—satisfied with acid and all the iron content in the form of insoluble $Fe_2O_3$.

When the copper and/or nickel have been completely, or to any desired degree, extracted in the aforesaid manner the metals and their acid radicles may be recovered from the solutions in any suitable manner, one method being to precipitate them with ammonia, obtained as hereinafter described—with or without carbonic acid—and thus obtain ammonium sulphate as a valuable by-product and the metals nickel and/or copper as oxides or carbonates together or separately.

The solid residue of gangue and iron oxide remaining from the extraction of the copper and/or nickel will contain any silver or gold or other precious metals which were present in the original material and these may be recovered by known means, e. g. cyaniding, amalgamation, chlorination and the like or by gravity concentration and smelting.

The oxides of copper and/or nickel or the crude metallic products may be reduced to metals of standard marketable quantities in known ways.

The apparatus in which I prefer to carry out the aforesaid reaction with oxygen is diagrammatically illustrated in the accompanying drawing.

The apparatus consists of an endless chain carrying a procession of trays or stacks of trays A which may be automatically filled and emptied by means of hoppers B and C and are caused to travel through a lengthy heat insulated tube or tubes D into which the oxygen (or air—enriched or otherwise—) is fed at one end at E and the exit gases pass out at the other end at F. During the passage through the tube or tubes, the trays with their content, and the gases, are made to interchange heat and the tubes and gases are heated if necessary at one zone of the passage, for example by passing a heating medium through one or more of the pipes G to ensure that the correct temperature is reached and also the proper regulation thereof during reaction.

The whole arrangement is somewhat similar to a "tunnel oven" with arrangements such that the trays are in part heated by the escaping gases before the latter are discharged and nearly cooled by the ingoing gases before the trays are emptied. The loading and unloading arrangements may be somewhat similar to those used in the sintering machines usually employed to prepare the charges for lead smelting blast furnaces.

A further feature of my invention is that I may generate the oxygen required for the reaction in part (say as to ¾) by the electrolysis of water and in part (say as to ¼) by the fractional compression and liquefaction of air.

I may then use the pure nitrogen and hydrogen so produced (as by-products from the oxygen manufacture) to produce ammonia by the well-known synthetic reactions and the ammonia so produced may be utilized to recover the metals copper and nickel from the solutions produced as aforesaid by precipitation in any convenient form and the resulting product, or by-product, of ammonium sulphate will add materially to profits and form a convenient means of disposing of the sulphur from sulphur-rich ores as for instance those of the Frood mine in Ontario. Any surplus sulphuric acid or exit gases containing sulphur oxides may also be combined with the cheaply produced ammonia aforesaid.

My invention thus constitutes a means for cheapening the production of copper and/or nickel—and other attendant metals—alone and also of the simultaneous production of very cheap ammonium sulphate. This part of my invention must not be regarded as merely adding on the ammonium sulphate manufacture to the copper and/or nickel manufacture. The hereindescribed combined and closely interwoven method of manufacture which has been evolved by experiment and research accomplishes such cheapening of the production of both products as renders possible the economical treatment of many low grade and complex materials which could not heretofore be treated in an economical manner and the production of ammonium sulphate in situations in which it could not be economically produced heretofore.

I do not limit my invention however to the full cycle of operations herein indicated but may employ any of the parts or steps thereof in any other desired or useful combinations, for instance the hereindescribed oxygen treatment may be employed merely as a perfect form of sulphatizing roast for copper and/or nickel ores for use in conjunction with any other forms of further use or treatment.

In the aforesaid oxygen treatment of the charges of mixed oxide and sulphide ores, e. g. of copper, it has been found that it is best to treat the charges in such manner that they are not disturbed or rabbled at all during reaction and cooling and in this way I have been able to obtain the highest water extractions of copper—amounting with properly proportioned charges—to about 95% or more of the total copper present without the use of acid at all.

The following example of an early experimental record will illustrate my invention.

An ore containing 5.47% copper and only 0.06% sulphur in the usual oxidized ore matrix was to be treated.

500 grams of this ore were ground to $-100$ mesh and mixed with 40 grams of ordinary iron sulphide likewise ground to $-100$ mesh.

The mixture was placed in a vertical retort 20″ long 3″ diameter constructed of resistant glass and fitted with a side tube near the open top end. The lower end was sealed like a large test tube. After the charge was put in, a hole 1″ diameter was cleared to the bottom of the retort by pressing in and withdrawing a former and the charge was packed tightly round the former before the latter was withdrawn. A rubber stopper—pierced by a small diameter intake pipe for oxygen gas, leading to the bottom of the hole in the packed charge—closed the open top end of the retort. A similar tube served as pyrometer tube. Both tubes hung freely in the 1″ hole in the packed charge. A train of bottles ending in a gas measuring cylinder and containing absorption liquids for exit gases (such as $SO_2$ or $CO_2$ or $Cl_2$ or $HCl$) was connected by india rubber tubing to the side tube of the retort in closed circuit so that all escaping gases could be suitably absorbed or if insoluble measured.

The retort was now heated in an electric resistance furnace for about two-thirds of its entire length which contained the charge and as soon as a temperature of 400° centigrade was reached oxygen gas was turned on in a stream of about 1 litre per minute and the heating current was shut off the furnace. The temperature rose to 600° centigrade somewhat rapidly and the oxygen stream was reduced to such a rate of flow as maintained that temperature. The whole of the gas was absorbed and nothing passed out of the retort except $CO_2$ gas from the malachite, which was absorbed in caustic soda, and a trifling amount of steam—which was at once condensed in the first (empty) bottle of the aforesaid train. This steam was derived from the water of hydration of the minerals acted on.

After about one and a half hours (during which the flow of oxygen had been considerably reduced) the oxygen gas ceased to be absorbed and passed through the chain of bottles to the measuring cylinder indicating that reaction was complete. At once the temperature began to fall and the treatment was over.

The charge was easily removed from the retort being scarcely at all caked and on lixiviation with water and subsequent washing of the residue with a little weak acid and filtering, yielded up nearly the whole of its copper—27.5 grams—to the solution as nearly pure copper sulphate. Only a trifling amount of iron was dissolved practically the whole iron present in or added to the ore being left in the residue as ferric oxide, imparting the characteristic rich red brown colour thereto.

The experiment was repeated many times using various natural iron copper and nickel minerals of like iron sulphide content to replace the artificial iron sulphide first employed, and the results were the same. Various copper sulphide and oxidized ores were similarly treated successfully.

Later experiments were carried out in a muffle of chromium steel heat insulated and provided with means of heating up and regulating the temperature by a small blow lamp. The muffle was 9" long by 6" wide and 5" deep and had the back end permanently closed and the front end provided with a gas-tight door at the lower part through which shallow trays of like material 1¼" deep and the size of the floor of the muffle, could be introduced and withdrawn. Each sheet steel tray held—comfortably—1 kilogram of the mixed charges.

The oxygen penetrates the material rapidly even although the charge is finely ground, stationary and closely packed and in layers several inches deep. Such layers may contain many tons of material to which the oxygen may only be accessible from the surface, bottom or sides.

The following Table I is a table of a few selected experiments with Rhodesian copper ores. The partially oxidized sulphide S 164 used in experiment No. 1 was an ore with an excessive amount (over 28%) of basic gangue material which would be wholly unsuitable for the economical extraction of the copper by acid leaching or in fact by any other known means. Hence arises the high proportion of sulphide concentrates required with those charges.

*Table I*

Ores experimented with

| | Cu | Fe | S | Insols. in HCl and HNO₃ |
|---|---|---|---|---|
| S163B N'Changa oxidized (a little sulphide)........contains.. | 2.42% | 0.90% | 0.19% | 91.25% |
| S164 N'Changa sulphide (a little oxidized)........contains.. | 3.96% | 2.60% | 1.47% | 75.70% |
| S151 Chalcopyrite concentrate........contains.. | 35.00% | 30.20% | 34.80% | Nil |
| S162 Chalcopyrite concentrate........contains.. | 30.50% | 27.64% | 31.07% | 10.20% |

In experiment No. 1 the ore S 164 was mixed with chalcopyrite concentrates S 151, heated by oxygen and extracted with water followed by a wash of 1500 ccs. of 5% sulphuric acid at room temperature.

In experiment No. 2 the ore S 164 was mixed with chalcopyrite concentrates S 151 heated by oxygen and extracted with water followed by a wash of 1500 ccs. of 5% sulphuric acid at room temperature.

In experiment No. 3, the ore S 163B was mixed with chalcopyrite concentrates S 162, covered with 10% of its weight of siliceous gangue heated by oxygen and extracted with water followed by a wash of 500 ccs. of 4% sulphuric acid at room temperature.

In experiment No. 4, the ore S 163B was mixed chalcopyrite concentrates S 162, heated by oxygen, cooled off, remixed and reheated with oxygen, extracted with water followed by a wash of 500 ccs. of 4% sulphuric acid at room temperature.

| Expt. No. | Ore used | | | | Copper extracted (Assays of solutions) in grams | Copper recovery per cent on residue assay and weight |
|---|---|---|---|---|---|---|
| | Number | Weight | Mesh | Copper content | | |
| 1. | S164 | 700 | −30 | 27.70 | In water extract.. 122.39 | 95.86% |
| | S151 | 300 | −100 | 105.00 | In H₂SO₄ wash.... 3.44 | |
| | Total. | 1,000 | Total. | 132.70 | Total.... 125.83 | |
| 2. | S164 | 650 | −30 | 25.70 | In water extract.. 139.46 | 96.83% |
| | S151 | 350 | −100 | 122.50 | In H₂SO₄ wash.... 2.71 | |
| | Total. | 1,000 | Total. | 148.20 | Total.... 142.17 | |
| 3. | S163B | 637.5 | −20 | 15.43 | In water extract.. 46.734 | 98.11% |
| | S162 | 112.5 | −100 | 33.93 | In H₂SO₄ wash.... 1.448 | |
| | Total. | 750.0 | Total. | 49.36 | Total.... 48.182 | |
| 4. | S163B | 850 | −20 | 20.57 | In water extract.. 64.032 | 97.65% |
| | S162 | 150 | −100 | 45.75 | In H₂SO₄ wash.... 0.691 | |
| | Total. | 1,000 | Total. | 66.32 | Total.... 64.723 | |

| No. | Consumption in grams of | | Ratio of copper extracted to | | Weight of residue in grams | Assay of residue | Residue assay calculated on original ore weight |
|---|---|---|---|---|---|---|---|
| | O₂ | H₂SO₄ | O₂ | H₂SO₄ | | | |
| 1. | 222.12 | 75.83 | 1:1.79 | 1:0.60 | 721.4 | 0.762% Cu | 0.440% Cu |
| 2. | 257.11 | 63.63 | 1:1.81 | 1:0.49 | 691.4 | 0.679% Cu | 0.470% Cu |
| 3. | 75.06 | 8.90 | 1:1.52 | 1:0.18 | 722.2 | 0.182% Cu | 0.175% Cu |
| 4. | 98.40 | 3.72 | 1:1.48 | 1:0.06 | 865.6 | 0.180% Cu | 0.156% Cu |

The amount of ammonium sulphate produced by precipitating all the iron and copper from these solutions by means of ammonia was:—

Experiment 1.................. 353.1 grams of ammonium sulphate.
Experiment 2.................. 365.9 grams of ammonium sulphate.
Experiment 3.................. 114.4 grams of ammonium sulphate.
Experiment 4.................. 151.6 grams of ammonium sulphate.

The following Table II shows a similar treatment of a copper nickel ore in which some ferrous chloride was employed.

*Table II*

Analysis of ore used

| Cu | 2.70% | Ni | 4.80% | S | 9.10% |
|---|---|---|---|---|---|
| Fe | 11.60% | Insols | 53.20% | Alkaline earths | 15.70% |

The ore used weighed 500 grams, was −50 mesh and contained 13.5 grams of Cu and 24.0 grams of Ni. The ore was mixed with 20% of its weight of ferrous chloride and heated in an atmosphere of oxygen and extracted with water. The residue was leached with a catch solution at 80° centigrade followed by a wash of 700 ccs. of 10% sulphuric acid at 80° centigrade. The consumption in grams of oxygen (estimated) and sulphuric acid was 64.57 and 21.71 respectively. The ratios of copper and nickel extracted to oxygen (estimated) and sulphuric acid were 1:1.72 and 1:0.58 respectively.

| Copper and nickel extracted (assay of solutions) | | Weight of residue | Assay of residue | Residue assay calculated on original ore weight |
|---|---|---|---|---|
| Cu | Ni | | | |
| In water extract.......... 12.08 | | | | |
| In catch solution leach... 0.063 | 0.585 | 380 | 0.18% Cu 0.23% Ni | 0.1368% Cu 0.1748% Ni |
| In H₂SO₄ wash...... 0.450 | 0.430 | | | |
| Total..... 12.593 | 23.3 (calculated from residue assay). | | | |

The amount of ammonium sulphate produced by precipitating all the copper, nickel and iron with ammonia was 112.296 grams.

The aforesaid reaction with oxygen is strongly exothermic and when once the charge has been raised to reaction temperature it goes on without any extraneous supply of heat. In order to start the reaction I may heat the charges or furnace for a short time in any suitable way or I may mix with the charges a very small amount of ground charcoal or any other fuel which will react with oxygen at quite low temperatures and will by its prior combustion bring the charge up to its requisite reaction temperature after which the reaction heat will maintain the temperature until the end if the oxygen supply is properly controlled.

The copper thus produced as a nearly pure sulphate of copper may be recovered from its solution and the acid also made use of in any known or suitable way.

My invention is further characterized in that in lieu of adding a sulphide e. g. ferrous sulphide to the oxidized ores to be treated as aforesaid I may substitute therefor wholly or in part ferrous sulphate and proceed to oxidize the mixture as aforesaid and described.

The proportion of ferrous sulphate should be such that the sulphuric anhydride which it contains should be sufficient (or more than sufficient) when taken together with the sulphion radicle ($SO_4$) which results from the oxidation of any natural sulphides of iron, copper or nickel present in the ore to produce neutral sulphates with all the copper and nickel so present plus any basic gangue matter present. The iron—both that added and that contained in the ore—will then be converted to ferric oxide and remain in the residue after extraction of the copper and/or nickel salts by means of water or weak acid and filtration.

If iron or sulphur are largely in excess, ferric sulphate—which first forms—will be largely undecomposed and being soluble will be dissolved out along with the copper and nickel sulphates. The ferric sulphate will react with ammonia preferentially before either copper or nickel sulphates, forming ferric hydroxide and ammonium sulphate. A sharp separation of copper and iron is thus possible.

Instead of ferrous sulphate I may use ferrous chloride with like results except that the resulting copper and/or nickel salts will then be chlorides in so far as their acid radicle is supplied from the oxidation of the added iron salt and sulphates in so far as the said radicle is produced from the oxidation of any natural or other sulphide present. If there is a superabundance of sulphur as iron sulphide in the charge most of the salts formed will be sulphates and the chlorine passes over mainly as hydrochloric acid.

The reaction which takes place with the added iron sulphate is as follows and a precisely analogous reaction results from the use of ferrous chloride:

(2)  $2CuCO_3 + 2FeSO_4 + O = 2CuSO_4 + Fe_2O_3 + 2CO_2$

It will be seen that whereas the oxidation of 2 molecules of ferrous sulphide requires nine atoms of oxygen the like oxidation of the sulphate in the aforesaid reaction requires but one atom and therein lies a very important economy.

The reactions aforesaid—either the chloride or the sulphate reaction—are nevertheless sufficiently exothermic to conduct the process without any supply of external heat except to raise the charge or a part of it to reaction temperature when the amount of sulphur and metals present is at all considerable.

I have found it preferable in these oxidations or chlorinations—which aim at producing a maximum amount of soluble copper and/or nickel salts in the charge before extraction—to treat the charge in a stationary state. To this end I may employ the apparatus hereinbefore described or any other convenient form, for instance I may employ a column or vertical shaft, and introduce the oxygen from above or below whilst the water and carbon dioxide escape from the bottom or top of the charge.

The ore may be crushed to any suitable degree of fineness. A very suitable grade is 20 to 30 mesh but coarser or finer may be employed.

From a consideration of the varied composition of the copper minerals in relation to these reactions it is seen that certain of them e. g. chalcopyrite, are capable of supplying sulphuric acid when oxidized greatly in excess of the amount required to form copper sulphate with all their copper content whilst others e. g. chalcocite, are capable of supplying acid only for a part of their copper content, and oxidized minerals e. g. malachite, chrysocolla and the like can supply no acid at all.

It is the judicious mixture of these minerals so that all the copper present and also certain of the gangue constitutents as aforesaid are satisfied with sulphuric acid, especially together with the use of oxygen—wholly or partly—in lieu of air, which brings about the success of this operation, in converting all—or nearly all—the copper to soluble sulphate in a completely or nearly completely, self heating—and therefore very economical—manner in contradistinction to the known methods of oxidizing roasting of such materials, whereby no such result is obtainable and much fuel is consumed.

My invention is also very well suited for the treatment of copper-iron bearing mattes, and especially for those containing troublesome impurities such as lead.

The mattes for this purpose may be ground and treated alone or—preferably—mixed as aforesaid with oxidized copper ores and treated with oxygen as aforesaid and leached with water. The copper is thus separated from the lead as soluble sulphate whilst the lead sulphate which is insoluble remains with the iron oxide in the residue after extraction.

Instead of pure oxygen I may employ in any of the aforesaid reactions air enriched in any suitable proportions with oxygen, or I may use oxygen to start and also to finish the reactions and air enriched with oxygen to maintain the reactions during their most vigorous phases and thus I may supply a considerable part of the total oxygen required more economically than by the pure gas.

When using oxygen alone and during the more vigorous phases of reaction no effluent gases at all escape from the apparatus and there is thus no troublesome evolution of sulphur dioxide.

When I covered the exposed surface of the charges on the trays with a layer of inert and barren material about one-sixteenth of an inch thick the extractions were still further improved and reached over 95% without the use of acid and 97 to 98% using acid in the ratio of only 0.1 parts of $H_2SO_4$ to 1.0 part of Cu.

The procedure and results with Canadian copper nickel ores were quite similar. It is an advantage in that case to mix from 5 to 20% of ferrous chloride with the charges and collect the gases which are given off in a little water and in this way obtain a strong solution of hydrochloric acid—with some sulphuric acid—and to use such solution to extract the last of the nickel from the water extracted residues, and also to regenerate the ferrous chloride for use again. In this manner the most complete extractions are obtainable. But the use of ferrous chloride as aforesaid is not essential to my invention and may be replaced by other means to extract the last of the nickel—e. g. sulphuric acid leaching, or retreatment with oxygen after admixing more sulphide material, or the addition and oxidation of ferrous sulphate.

When an ore or concentrate contains so much sulphur combined with iron that it is not convenient to provide the requisite amount of oxidized material to treat with it in order to get the balanced reactions, as described hereinbefore, the sulphur in the said material may be reduced by previous roasting or pyritic smelting or the oxygen treatment may be applied to the unroasted and unmixed material and the $SO_2$ gas which will in that case be given off during the oxygen treatment may be collected and put to any useful purpose.

Some of the aforesaid Canadian copper nickel ores contain 25% or more of sulphur and may be advantageously treated in this manner.

It will be seen that I may employ my invention either in the direct treatment of sulphide ores or sulphide concentrates or mattes or the like in lieu of or as an adjunct to the usual flotation process and in lieu of smelting. Or I may employ it to treat to the greatest possible advantage any desired mixture—be it artificial or natural—of "sulphide" and "oxidized" copper-containing minerals containing also iron sulphides or sulphate for which the materials are available at the place of treatment.

Throughout this specification the term ore or material is intended—whenever applicable by the context—to include any ore or concentrate matte slag dross residue or other material from which the copper with or without other metals is to be extracted.

The terms furnace, or similar expressions, are intended to include horizontal, sloping, or vertical retorts, muffles, closed or open furnaces, kilns, tunnel ovens, chambers, moving pallet devices or any form of heating apparatus the heat for which may be supplied by solid, liquid or gaseous fuels or by electricity, internally or externally applied or by the heat of reaction of the process.

For the leaching or extraction operations I may employ any suitable form of vats or vessels—with or without agitating devices and/or filters—or I may employ air agitation or open vat percolation leaching.

The preferred means which I have described of precipitating the copper by means of ammonia may be replaced—without departing from my invention—by other known or any suitable methods of recovering copper from the solutions as for example electrolysis.

What I claim is:

1. In the treatment of ores, concentrates, mattes and other material containing copper and an iron sulphur compound for the extraction of the metal contents thereof, subjecting the mass of the material while quiescent to a supply of oxygen so regulated as to oxidize the sulphur and maintain the material after initial heating and with a little supplementary heating when required for regulation at a temperature of about 600° C. whereby substantially the whole of the copper is converted into the water soluble sulphate of the metal and all the iron into iron oxide and iron sulphate.

2. In the treatment of ores, concentrates, mattes and other materials containing copper, adjusting the amount of the sulphur combined with iron in the mass so that there is sufficient sulphur to form $SO_3$ to satisfy all basic materials other than iron in the mass, and subjecting the mass while quiescent to initial heating and to sufficient oxygen to maintain the mass after initial heating at a temperature of about 600° C. whereby the whole of the copper is converted into the water soluble sulphate of the metal.

3. In the treatment of ores, concentrates, mattes and other materials containing copper, adjusting the amount of sulphur combined with iron in the mass to provide sufficient sulphur to form $SO_3$ to satisfy all basic materials other than iron in the mass, and subjecting the mass while quiescent to initial heating and to a regulated supply of oxygen and heat to maintain the mass at a temperature of 600° C. after the initial heating whereby the whole of the copper is converted into the water soluble sulphate of the metal.

4. In the treatment of ores, concentrates, mattes and other materials containing copper and nickel, adjusting the amount of sulphur combined with iron in the mass to provide sufficient sulphur to form $SO_3$ to satisfy all basic materials other than iron in the mass and subjecting the mass while quiescent to initial heating and to a regulated supply of oxygen to maintain the mass at a temperature of 600° C. after the initial heating whereby the whole of the copper and nickel is converted into water soluble sulphates of the metals.

5. In the treatment of ores, concentrates, mattes and other materials containing copper and a sulphur compound, subjecting the mass of the material while quiescent to a supply of oxygen so regulated as to oxidize the sulphur and maintain the material after initial heating and with a little supplementary heating when required for regulation at a temperature of about 600° C. whereby substantially the whole of the copper is converted into the water soluble sulphate of the metal.

6. In the treatment of ores, concentrates, mattes and other materials containing copper and a sulphur compound, admixing with the material ferrous chloride and subjecting the mass of the material while quiescent to a supply of oxygen at a temperature of about 600° C. whereby substantially the whole of the copper is converted into the water soluble sulphate and chloride of the metal.

7. In the treatment of ores, concentrates, mattes and other materials containing copper, adjusting the amount of sulphur combined with iron in the mass to provide sufficient sulphur to form $SO_3$ to satisfy all basic materials other than iron, subjecting the mass while quiescent to initial heating and to a regulated supply of oxygen and heat to maintain the mass at a temperature of 600° C. after the initial heating whereby the whole of the copper is converted into water soluble copper sulphate and recovering the copper by treatment with ammonia with the addition of carbonic acid.

8. In the treatment of ores, concentrates, mattes and other materials containing copper, admixing a suitable proportion of ferrous sulphate with the mass and subjecting the mass while quiescent to initial heating and to sufficient oxygen to maintain the mass after initial heating at a temperature of about 600° C. whereby the whole of the copper is converted into water soluble copper sulphate.

9. In the treatment of ores, concentrates, mattes and other materials containing copper, and a sulphur compound, subjecting the mass while quiescent to initial heating, to a supply of oxygen to start the reaction, to a supply of air enriched with oxygen to maintain the reaction and to a supply of oxygen to finish the reaction, all at a temperature of 600° C. with a little supplementary heating when required whereby the whole of the copper is converted into water soluble copper sulphate.

10. In the treatment of ores, concentrates, mattes and other materials containing copper and a sulphur compound, covering the surface of the mass of material with a thin layer of inert and barren material and subjecting the mass while quiescent to initial heating and a regulated supply of oxygen to maintain a temperature of 600° C. whereby the whole of the copper is converted into water soluble copper sulphate.

11. In the treatment of ores, concentrates, mattes and other materials containing copper and a sulphur compound, subjecting the mass of material to a preliminary heat treatment to reduce the sulphur content and then while quiescent to a regulated supply of oxygen to maintain a temperature of 600° C. whereby the whole of the copper is converted into water soluble copper sulphate.

12. In the treatment of ores, concentrates, mattes and other materials containing copper, nickel and a sulphur compound, subjecting the mass of material while quiescent to a supply of oxygen so regulated as to oxidize the sulphur and maintain the material after initial heating and with a little supplementary heating when required for regulation at a temperature of about 600° C. whereby substantially the whole of the copper and nickel is converted into the water soluble sulphates of the metals.

13. In the treatment of ores, concentrates, mattes and other materials containing copper, nickel and a sulphur compound, admixing with the material ferrous chloride and subjecting the mass of the material while quiescent to a supply of oxygen at a temperature of about 600° C. whereby substantially the whole of the copper and nickel is converted into the water soluble sulphates and chlorides of the metals.

In testimony whereof I have signed my name to this specification.

EDGAR ARTHUR ASHCROFT.